United States Patent [19]
Umemoto et al.

[11] Patent Number: 5,430,731
[45] Date of Patent: Jul. 4, 1995

[54] RADIO TELE-COMMUNICATION SYSTEM USING TDMA SCHEME TO REDUCE SIGNAL INTERFERENCE

[75] Inventors: Yuji Umemoto; Koichi Ito; Masayuki Tanaka, all of Tokyo, Japan

[73] Assignee: Kabushiki Kaisha Toshiba, Kanagawa, Japan

[21] Appl. No.: 729,202

[22] Filed: Jul. 12, 1991

[30] Foreign Application Priority Data

Jul. 12, 1990 [JP] Japan .................... 2-184613

[51] Int. Cl.[6] ............................................. H04J 3/06
[52] U.S. Cl. ................... 370/95.1; 370/100.1; 455/54.1
[58] Field of Search .............. 370/100.1, 95.1, 95.3, 370/104.1, 105.2; 455/54.1, 56.1; 371/42, 47.1; 379/59

[56] References Cited
U.S. PATENT DOCUMENTS

| | | | |
|---|---|---|---|
| 4,472,802 | 9/1984 | Pin et al. ................ | 370/100.1 |
| 4,774,708 | 9/1988 | Hotta ....................... | 370/104.1 |
| 4,947,451 | 8/1990 | Nawata .................... | 370/95.1 |

*Primary Examiner*—Douglas W. Olms
*Assistant Examiner*—Min Jung
*Attorney, Agent, or Firm*—Banner, Birch, McKie & Beckett

[57] ABSTRACT

In a radio tele-communication system of this invention, at least one radio frequency is shared by a plurality of base stations and a plurality of mobile stations, a signal transmitted at the radio frequency has a time frame constituted by a plurality of time-divisionally multiplexed time slots, and time intervals for detecting timing shifts are set between the plurality of time slots. In at least either the base stations or mobile stations, a communication timing shift in a time slot currently used for communication is detected from a reception state in one of the time intervals for detecting timing shifts, and the communication timing of the corresponding time slot is corrected in cooperation with a station, with which communication is performed, on the basis of the communication timing shift detection result.

11 Claims, 12 Drawing Sheets

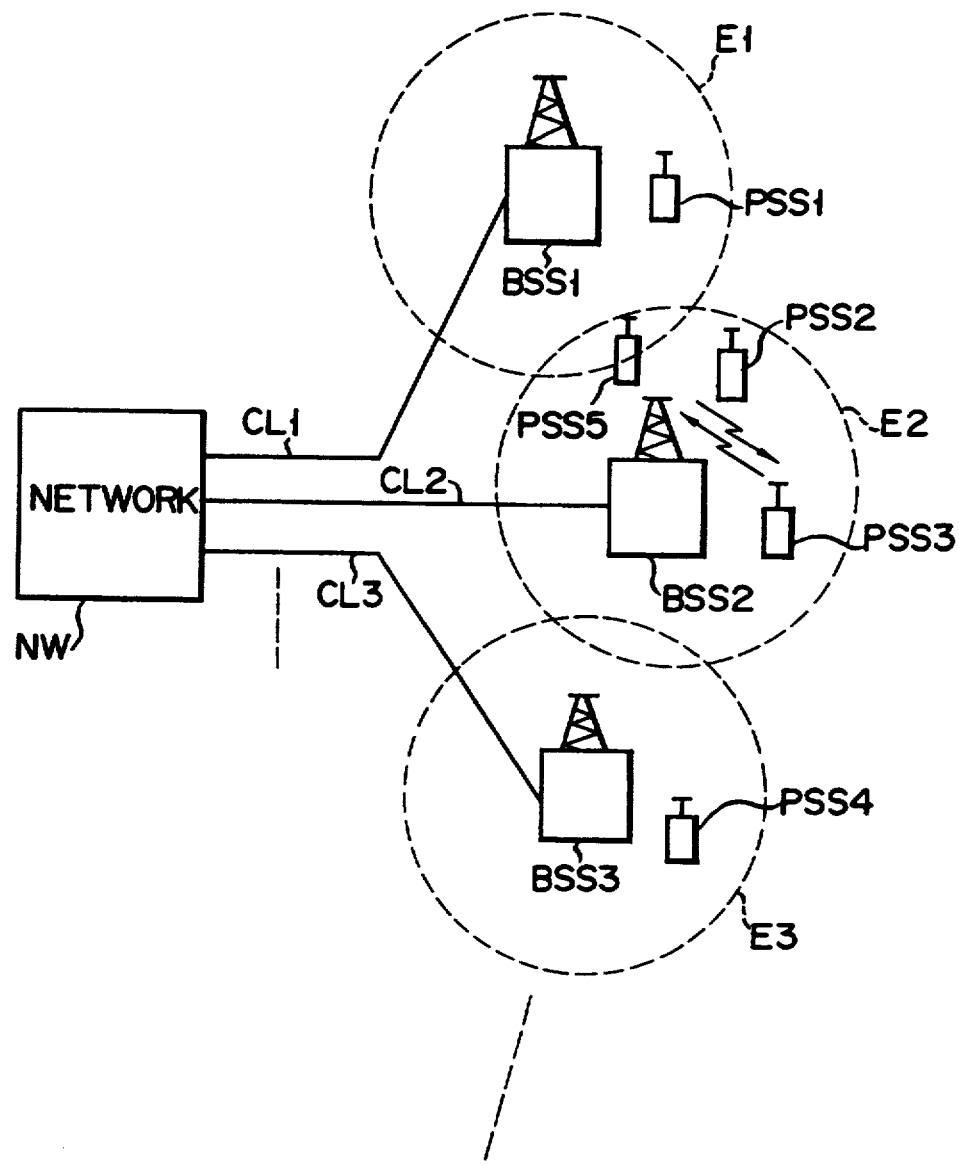
F I G. 1

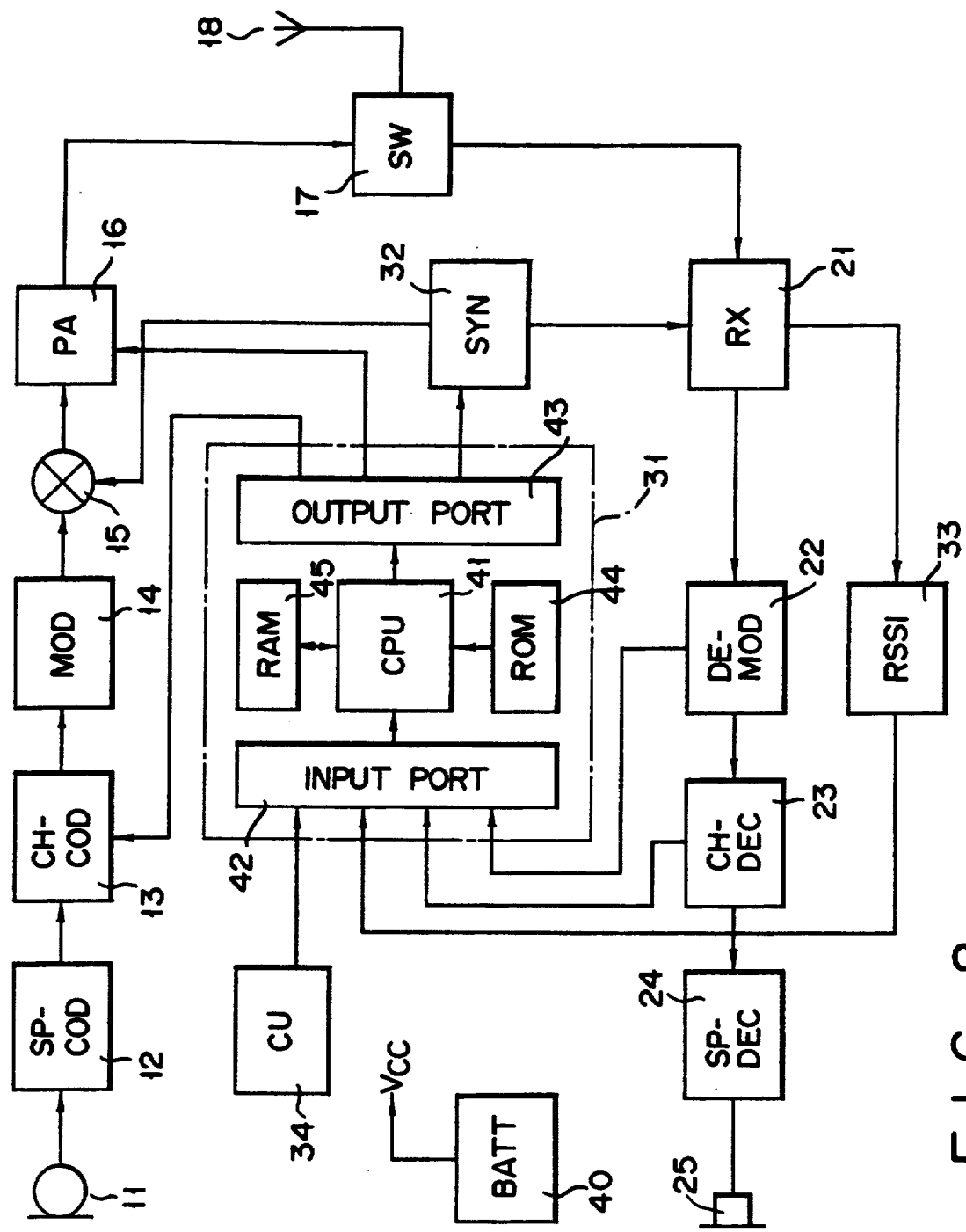
F I G. 2

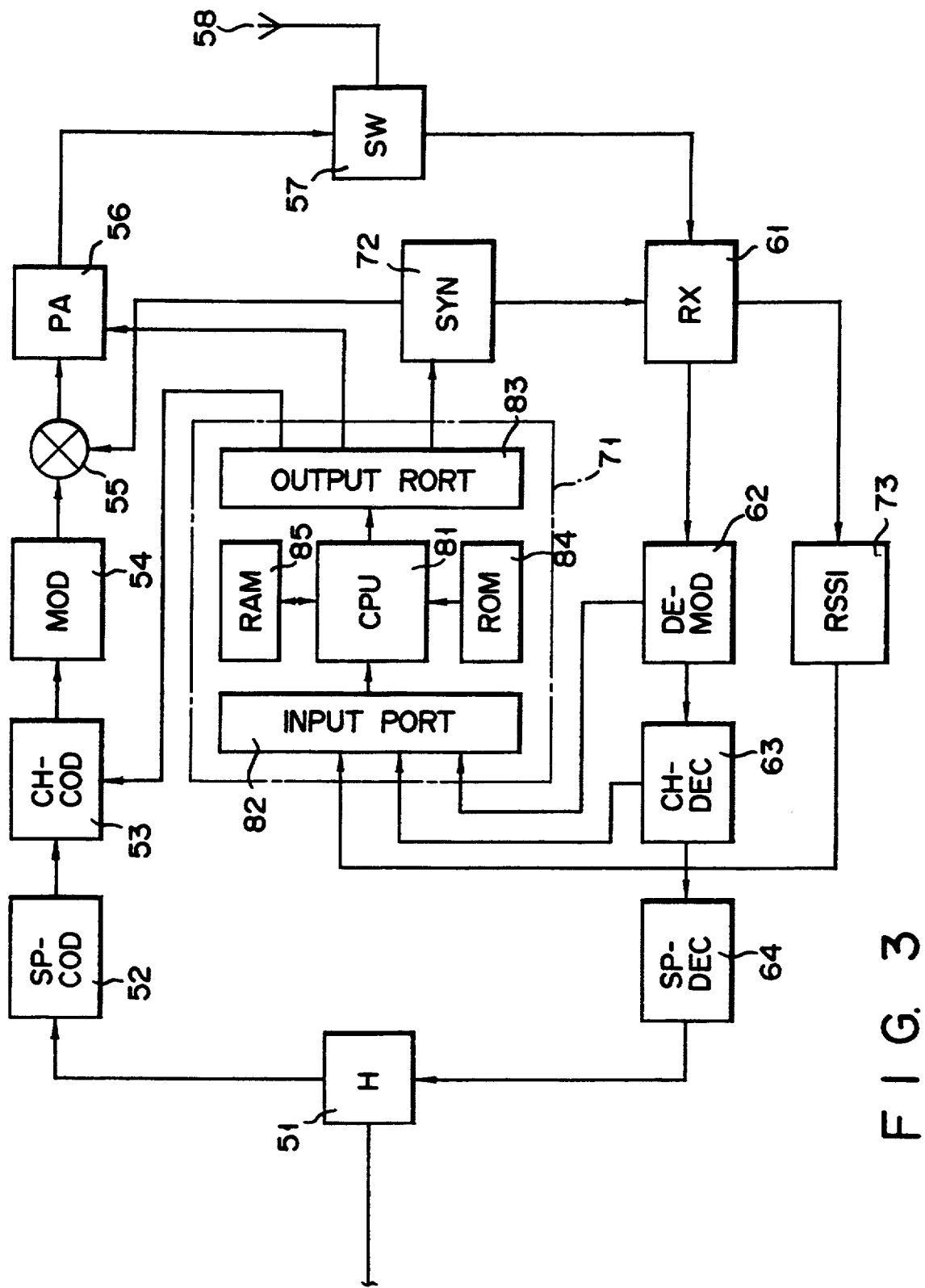
F I G. 3

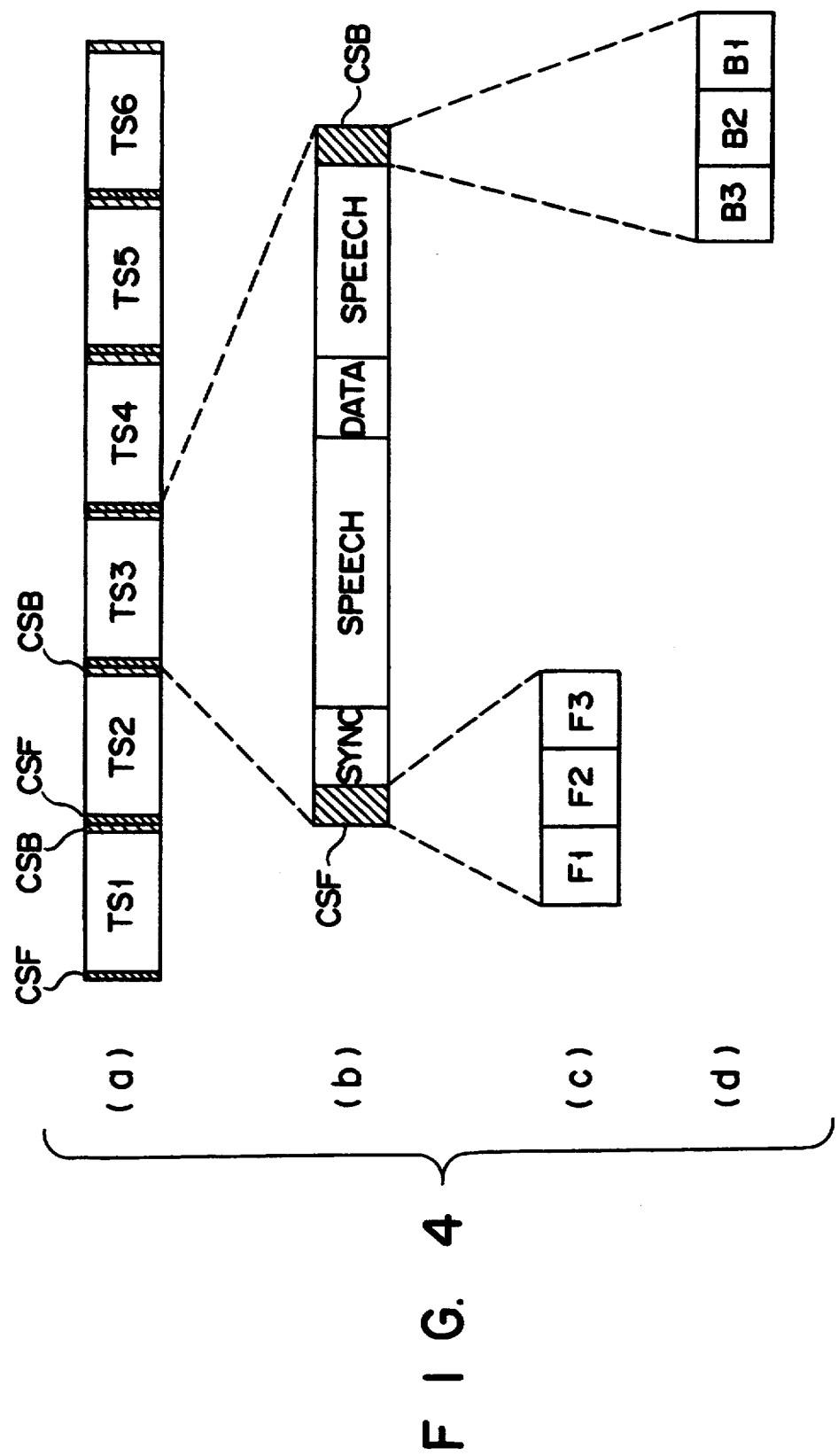
F I G. 4

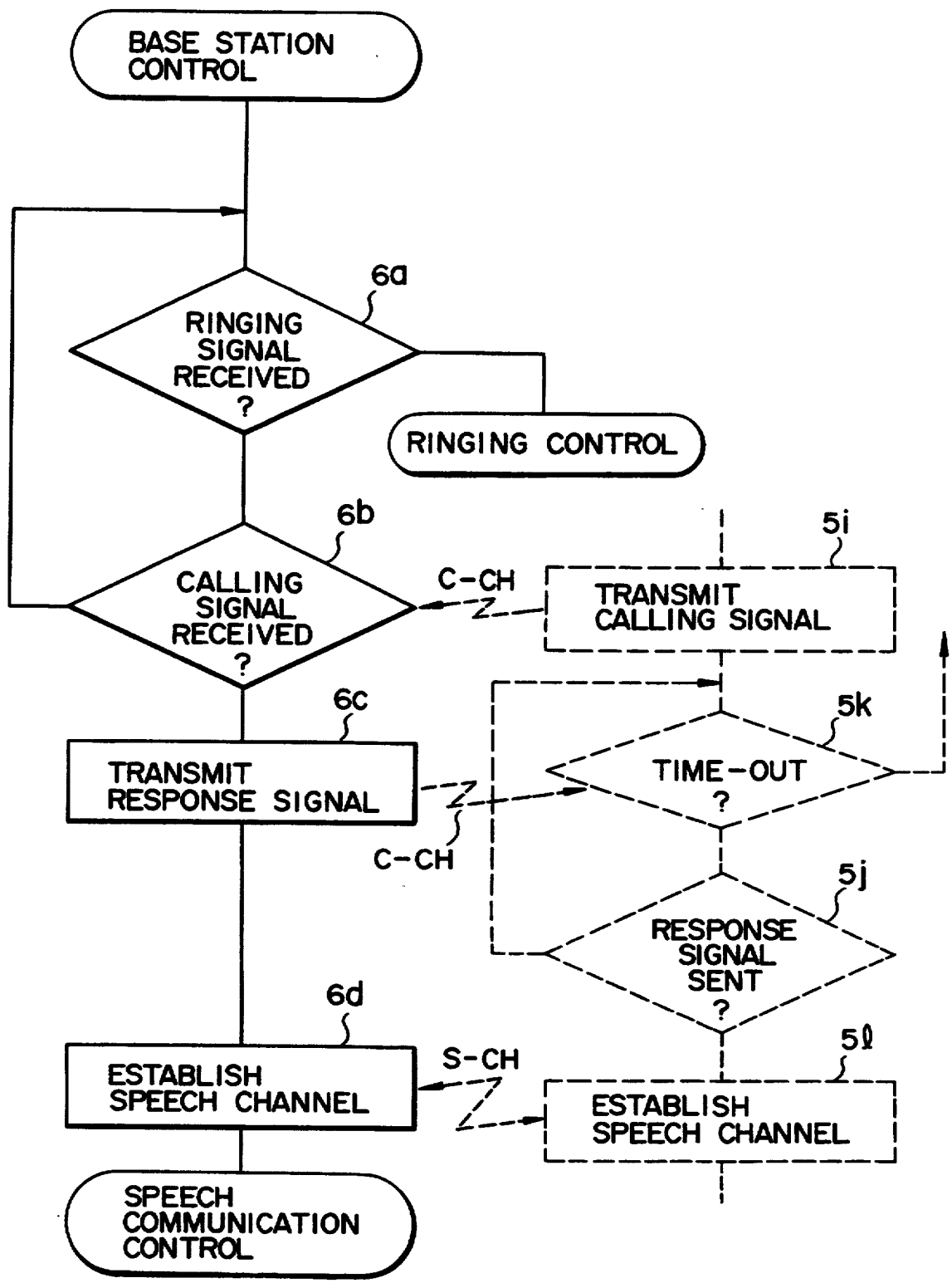
F I G. 5A

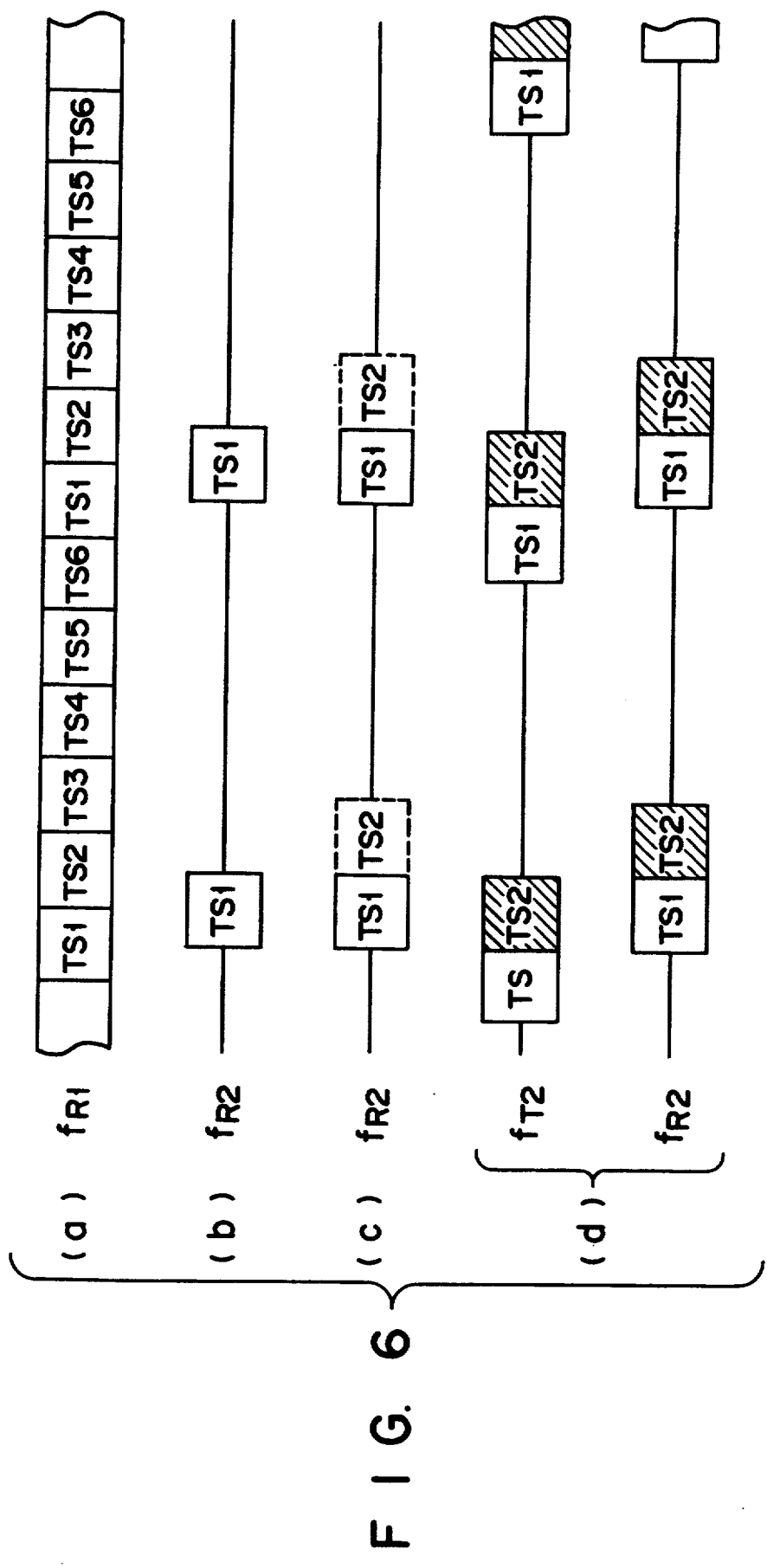
F I G. 6

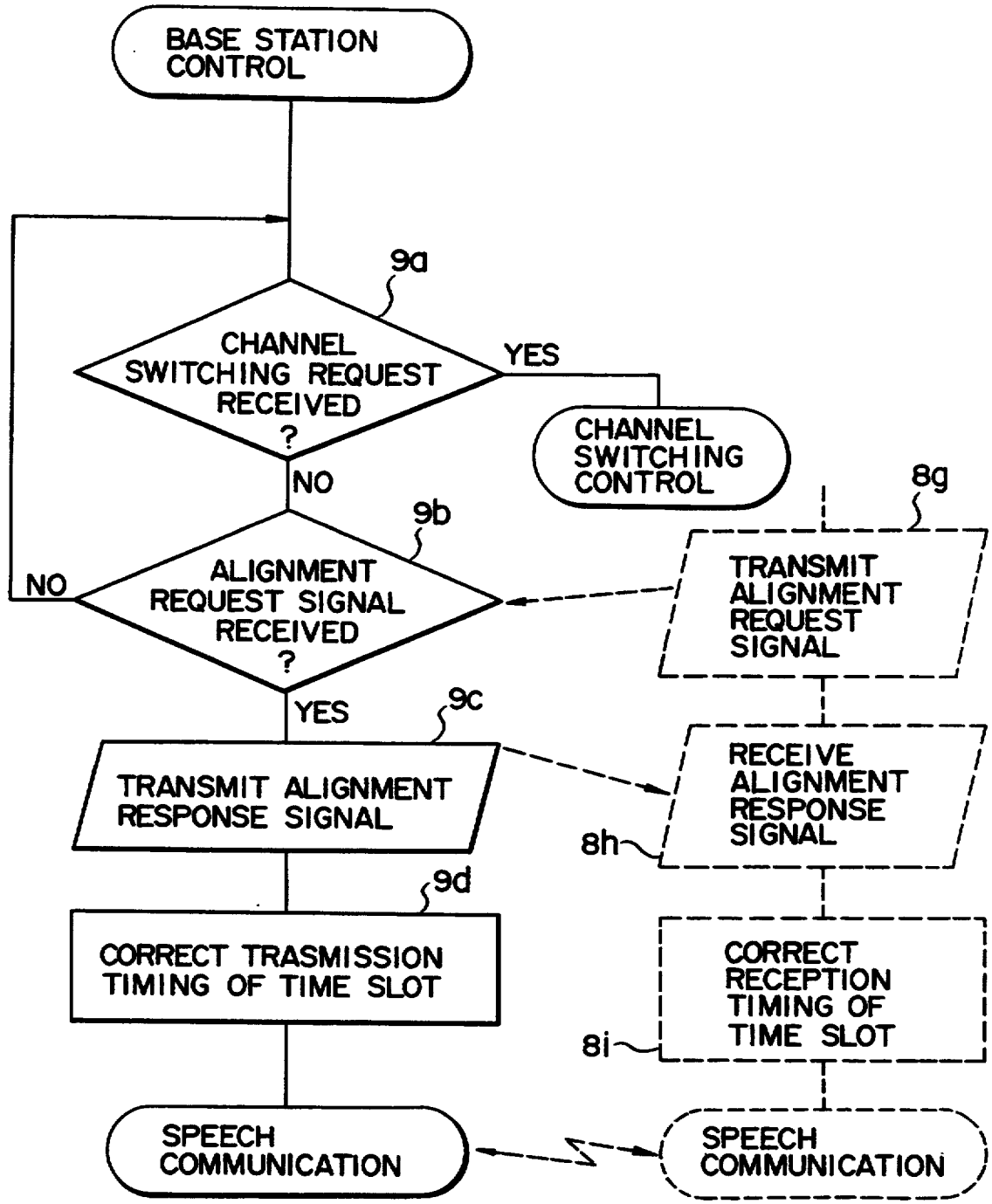
F I G. 8A

RADIO TELE-COMMUNICATION SYSTEM USING TDMA SCHEME TO REDUCE SIGNAL INTERFERENCE

BACKGROUND OF THE INVENTION

1. Field of the Invention

The present invention relates to a radio telecommunication system such as a portable radio telephone system or a vehicle telephone system and, more particularly, to a system employing a TDMA scheme as a radio channel access scheme.

2. Description of the Related Art

As a system of this type, for example, a cellular radio telephone system is available. FIG. 10 shows a schematic arrangement of a cellular radio telephone system.

This system comprises a control station CS, a plurality of base stations BS1 to BSn, and a plurality of mobile stations PS1 to PSm. The control station CS is connected to a wire network NW. The plurality of base stations BS1 to BSn are connected to the control station CS through wire lines CL1 to CLn, respectively. The base stations BS1 to BSn form radio zones E1 to En in different areas. The plurality of mobile stations PS1 to PSm are connected through radio channels to the base stations in the radio zones in which they are located and are further connected to the wire network NW through the base stations and the control station CS.

This system employs a multichannel scheme for accessing radio frequencies. In the multichannel access scheme, a plurality of speech radio frequencies and a small number of control radio frequencies are shared by the base stations BS1 to BSn and the mobile stations PS1 to PSm. When a calling signal is generated by a given mobile station or a ringing signal is received from the wire network NW, a free speech radio frequency and a free control radio frequency are selected from these speech radio frequencies and control radio frequencies, thus performing radio communication between the mobile and base stations.

Assume that a calling operation is performed by a given mobile station. In this case, in the mobile station, a free control radio frequency is selected from the small number of control radio frequencies. The selected control radio frequency is used as a control channel, and communication of a control signal associated with a calling or ringing operation is performed between the mobile station and the corresponding base station. At this time, in the control station, a free speech radio frequency is selected from the plurality of speech radio frequencies. Thereafter, radio channel designation information representing the selected free speech control radio frequency is inserted in the control signal to be transmitted from the base station to the mobile station. Subsequently, speech communication can be performed between the mobile and base stations by using the free speech radio frequency as a speech channel.

In a system of this type, the most important subject is associated with an increase in office service capacity.

Under the circumstances, a TDMA scheme has recently been proposed as a scheme for accessing radio channels between base stations and mobile stations. In the TDMA scheme, a signal to be transmitted at each speech radio frequency is formatted to have a time frame. One time frame is constituted by six time-divisionally multiplexed time slots. The time slots of each speech radio frequency are respectively assigned, as speech channels, to mobile stations. The respective mobile stations perform radio communication with corresponding base stations by using the time slots assigned to them. If this TDMA scheme is employed, the office service capacity can be increased six times that of a conventional system.

In a radio tele-communication system using such a TDMA scheme, the following problems are posed. In a system of this type, the same speech radio frequency is sometimes used in a plurality of base stations, e.g., the base stations BS1 and BS2 at once. In this case, the mobile station PS5, which is located in an area where the radio zones of the base stations BS1 and BS2 overlap, may receive a wave from the base station BS2 in addition to a wave from the base station BS1 with which the mobile station PS5 communicates.

In some system, the base stations BS1 and BS2 are asynchronous with each other. In such a case, while a given mobile station performs a speech communication with the base station BS1 for a long period of time, a relative positional shift may occur between the current used time slot and an adjacent time slot transmitted from the other base station BS2 due to the precision difference between clock frequencies used in the base stations BS1 and BS2, resulting in interference between the time slots. If such interference occurs, errors are caused in speech communication data, and the quality of speech communication greatly deteriorates. If the degree of interference is high, the mobile station cannot detect a sync signal inserted in a time slot. As a result, a step-out occurs, and the speech communication may be interrupted, thus posing a serious problem.

In order to solve this problem, the clock precision of the base and mobile stations may be improved or a sufficient guard time may be set between time slots to absorb the positional shift between the time slots. The former method leads to an increase in cost of each station circuit. In the latter method, the transmission efficiency is decreased.

SUMMARY OF THE INVENTION

It is an object of the present invention to provide a radio tele-communication system which can prevent interference between time slots without increasing the cost of a circuit in each station and degrading the transmission efficiency, so as to reduce the cost of the system and improve the transmission efficiency, and which always allows high-quality communication.

It is another object of the present invention to provide a radio tele-communication system which can detect not only the presence/absence of a timing shift but also a shift amount, thereby allowing more proper timing correction.

It is still another object of the present invention to provide a radio tele-communication system which can prevent interference between time slots even if correction of a timing shift cannot be performed.

In order to achieve the above objects, according to the present invention, there is provided a radio tele-communication system wherein at least one radio frequency is shaped by a plurality of base stations and a plurality of mobile stations, a signal transmitted at the radio frequency has a time frame constituted by a plurality of time-divisionally multiplexed time slots, and time intervals for detecting timing shifts are set between the plurality of time slots. At least either of the base and mobile stations includes a timing shift detecting means and a timing correcting means. A communication timing shift in a time slot currently used for communication is detected by the timing shift detecting means from a reception state in one of the time intervals for detecting timing shifts. The communication timing of the corresponding time slot is corrected by the timing correcting means in cooperation with a station, with which communication is performed, on the basis of the communication timing shift detection result obtained by the timing shift detecting means.

With this arrangement, if the transmission/reception timing of a time slot currently used for transmission is shifted and this timing shift enters one of the timing shift detection intervals, this state is detected by the timing shift detecting means, and the transmission/reception timing of the time slot is corrected by the timing correcting means on the basis of the detection result. Therefore, even if a timing shift occurs in a time slot, the transmission/reception timing of the time slot can be corrected before interference is caused between the time slot and its adjacent time slot, thus preventing interference between time slots. That is, the transmission/reception timing of a time slot can be automatically corrected, and the time slot can always be kept at a proper position during a speech communication period. Therefore, a mobile station can always perform high-quality communication without causing interference with time slots used by other mobile stations. In addition, since the clock precision of the base and mobile stations need not be improved to prevent interference between time slots, the circuit of each station can be simplified and reduced in cost. Furthermore, the length of each timing shift detection interval can be set to be relatively small, i.e., a relatively short period of time required for detecting a timing shift, but need not be set to be as long as a guard time for absorbing interference between time slots. Therefore, a deterioration in transmission efficiency can be minimized.

In addition, in the present invention, each of the time intervals for detecting timing shifts is time-divisionally divided into sub-intervals, and the timing shift detecting means detects a communication timing shift amount from a reception state in each of the plurality of sub-intervals. The timing correcting means corrects the communication timing of the corresponding time slot on the basis of the communication timing shift amount detected by the timing shift detecting means.

With this arrangement, both a timing shift and a shift amount can be detected so that more proper timing correction can be performed.

In another radio tele-communication system of the present invention, either of the plurality of base and mobile stations includes timing shift detecting means, determining means, timing correcting means, and channel changing means. The timing shift detecting means detects a communication timing shift in a time slot currently used for communication from a reception state in one of the time intervals for detecting timing shifts. On the basis of the communication timing shift detection result obtained by the timing shift detecting means, the determining means checks whether a communication timing of the corresponding time slot can be corrected. If the determining means determines that the communication timing can be corrected, the timing correcting means corrects the communication timing of the corresponding time slot in cooperation with a station, with which communication is performed. If the determining means determines that the communication timing cannot be corrected, the channel changing means changes the time slot in cooperation with the station with which communication is performed.

According to the present invention, the following effect can be obtained. Assume that a given mobile station is performing communication, and time slots currently used for communication by other mobile stations are present both before and after a time slot used for communication by the given mobile station. In this case, the timing of the time slot cannot be corrected. In the present invention, whether timing correction can be performed is determined by the determining means. If timing correction cannot be performed, the current speech channel is switched to another speech channel. In such a case, therefore, interference between time slots can be prevented, and speech communication can be continued with high quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of a portable radio telephone system according to an embodiment of the present invention;

FIG. 2 is a block diagram showing an arrangement of each mobile station in the system shown in FIG. 1;

FIG. 3 is a block diagram showing an arrangement of each base station in the system shown in FIG. 1;

FIGS. 4(a)–(d) are timing charts showing the formats of signals to be transmitted at speech radio frequencies;

FIGS. 5A and 5B are flow charts showing the control sequences, associated with a calling operation, and control contents of control circuits of each base station and each mobile station;

FIGS. 6(a)–(d) and 7(a)–(c) are timing charts for explaining an operation of the system shown in FIG. 1;

DETAILED DESCRIPTION OF THE PREFERRED EMBODIMENTS

Figure 5B:
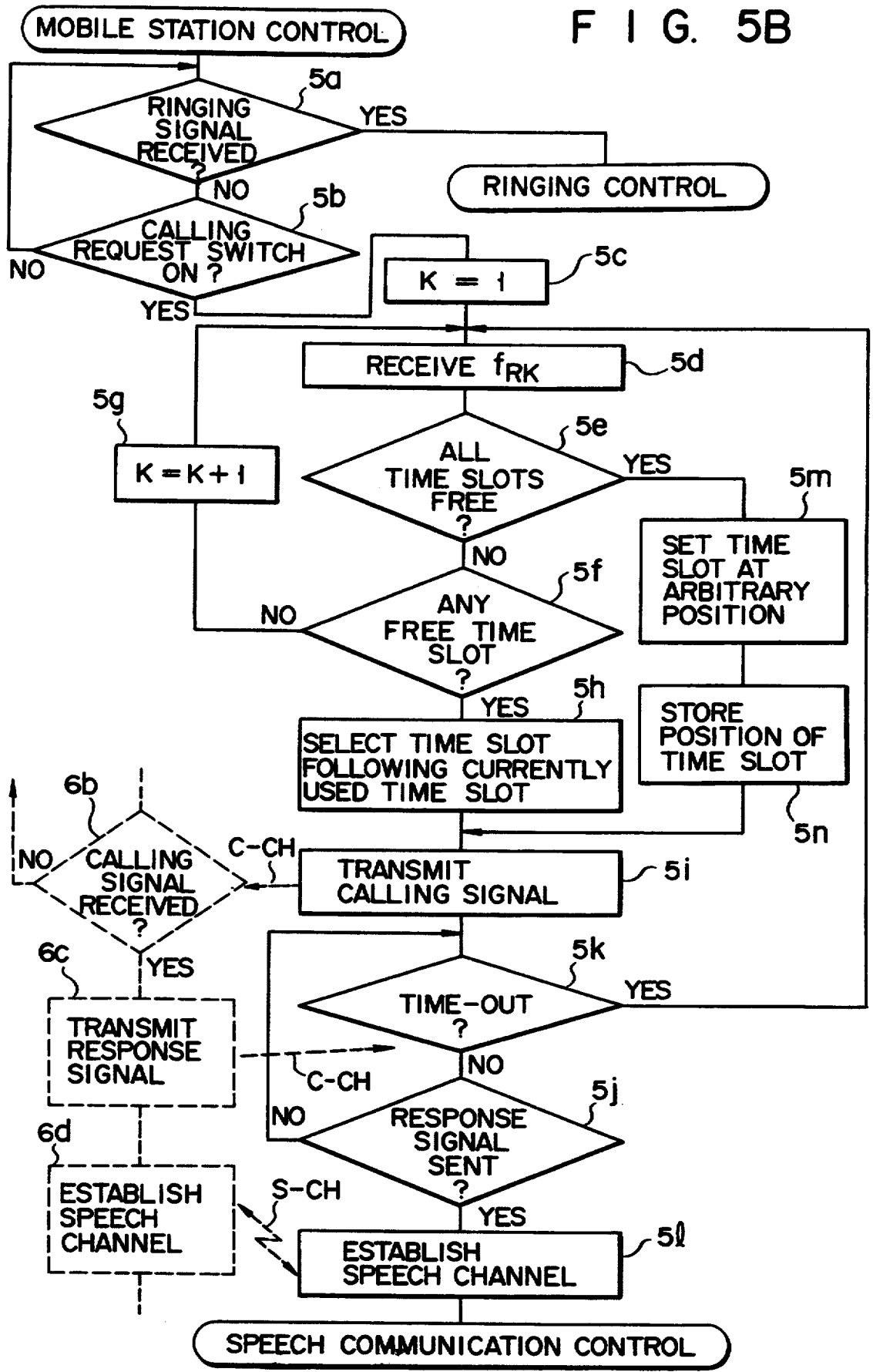

An embodiment in which the present invention is applied to a portable radio telephone system will be described first.

FIGS. 4(a)–(d) show the formats of signals to be transmitted at speech radio frequencies. One time frame is time-divisionally divided into six time slots TS1 to TS6, as shown in FIG. 4(a). In addition, forward shift detecting portions CSFS are respectively set at the leading ends of the time slots TS1 to TS6, whereas backward shift detecting portions CSB are respectively set at the trailing ends of the time slots TS1 to TS6.

Each of the time slots TS1 to TS6 of a signal transmitted from a mobile station to a base station has a format shown in FIG. 4(b). More specifically, a frame sync word SYNC is arranged at the leading end of the time slot, and a speech signal information bit SPEECH, control data bit DATA, and a speech signal information bit SPEECH are subsequently arranged in the order named. As shown in FIGS. 4(c) and 4(d), the forward shift detecting portion CSF is time-divisionally divided into three detection units F1, F2, and F3; and the backward detecting portion CSB, three detection units B3, B2, and B1.

FIG. 1 is a block diagram showing the arrangement of the portable radio telephone system of this embodiment. The system comprises a plurality of base stations BSS1 to BSSn and a plurality of mobile stations PSS1 to PSSm. The base stations BSS1 to BSSn are connected to a wire network NW through wire lines CL1 to CLn, respectively. The base stations BSS1 to BSSn form radio zones E1 to En in different areas. The mobile stations PSS1 to PSSm are connected to the corresponding base stations through radio channels within the radio zones E1 to En formed by the base stations BSS1 to BSSn.

FIG. 2 is a block diagram showing the arrangement of each of the mobile stations PSS1 to PSSm. Each of the mobile stations PSS1 to PSSm is roughly divided into a transmission system, a reception system, and a control system. Note that reference numeral 40 denotes a battery as a power source.

The transmission system comprises a transmitter 11, a speech coder (SP-COD) 12, an error correction coder (CH-COD) 13, a digital modulator (MOD) 14, a multiplier 15, a power amplifier (PA) 16, a high-frequency switch (SW) 17, and an antenna 18. The speech coder 12 codes an analog transmission speech signal output from the transmitter 11. The error correction coder 13 performs error correction coding of the coded transmission speech signal output from the speech coder 12 and of a coded control signal output from a control circuit 31 (to be described later). The digital modulator 14 generates an IF signal modulated by the coded transmission speech signal output from the error correction coder 13. For example, a $\pi/4$ shifted QPSK scheme is used as a modulation scheme. In the multiplier 15, the IF signal is mixed with a local oscillation signal output from a frequency synthesizer 32 to be formed into a high-frequency transmission signal. In the power amplifier 16, the high-frequency transmission signal output from the multiplier 15 is amplified to have a predetermined transmission power. The high-frequency switch 17 is kept ON only during a period corresponding to a transmission time slot designated by the control circuit 31. During this period, the radio transmission signal output from the power amplifier 16 is supplied to the antenna 18 to be transmitted to a corresponding one of the base stations BSS1 to BSSm.

The reception system comprises a receiver (RX) 21, a digital demodulator (DEM) 22, an error correction decoder (CH-DEC) 23, a speech decoder (SP-DEC) 24, and a telephone receiver 25. In the receiver 21, a high-frequency reception signal received in a predetermined time slot is frequency-converted into an IF signal. The digital demodulator 22 establishes bit and frame synchronization with respect to the reception IF signal output from the receiver 21, and demodulates it into a coded reception signal. Note that information associated with the above-mentioned synchronization establishment is supplied to the control circuit 31. The error correction decoder 23 performs error correction decoding of the coded modulated signal output from the digital demodulator 22. Thereafter, a coded reception speech signal obtained by this error correction decoding is output to the speech decoder 24, and the coded control signal is supplied to the control circuit 31. The speech decoder 24 decodes the coded reception speech signal. As a result, the analog reception speech signal restored by this decoding operation is amplified and output from the telephone receiver 25.

The control system comprises the control circuit (CONT) 31, the frequency synthesizer (SYN) 32, a reception field strength detector (RSSI) 33, and a console unit (CU) 34. The frequency synthesizer 32 generates a local oscillation frequency corresponding to a radio channel designated by the control circuit 31. The reception field strength detector 33 detects the reception field strength of a radio wave transmitted from each of the base stations BSS1 to BSSn, and supplies the detection signal to the control circuit 31. The console unit 34 includes a transmission switch, dial keys, a liquid crystal display, and the like.

The control circuit 31 is constituted by, e.g., a microcomputer. This microcomputer includes a central processing unit (CPU) 41, an input port 42, an output port 43, a program ROM 44, and a data RAM 45. The CPU 41 executes a predetermined control operation in accordance with a program stored in the program ROM 44 in advance.

Each of the base stations BSS1 to BSSn has an arrangement shown in FIG. 3. Similar to the mobile stations PSS1 to PSSm, each of the base stations BSS1 to BSSn is roughly divided into a transmission system, a reception system, and a control system.

The transmission system comprises a hybrid circuit 51, a speech coder (SP-COD) 52, an error correction coder (CH-COD) 53, a digital modulator (MOD) 54, a multiplier 55, a power amplifier (PA) 56, a high-frequency switch (SW) 57, and an antenna 58. The speech coder 52 codes an analog speech signal transmitted from the wire network side. The error correction coder 53 performs error correction coding of the coded speech signal output from the speech coder 52 and a digital control signal output from a control circuit 71 (to be described later). The digital modulator 54 generates a modulated IF signal modulated by the coded transmission speech signal output from the error correction coder 53. For example, a $\pi/4$ shifted QPSK ($\pi/4$ shifted differentially encoded quadrature phase shift keying) scheme is used as a modulation scheme. In the multiplier 55, the IF signal is multiplied by a local oscillation signal output from a frequency synthesizer 72 to be converted into a high-frequency transmission signal. The high-frequency transmission signal output from the multiplier 55 is amplified by the power amplifier 56 to have a predetermined transmission power. The high-frequency switch 57 is kept on only during a period corresponding to a transmission time slot designated by the control circuit 71. During this period, the radio transmission signal output from the power amplifier 56 is supplied to the antenna 58 to be transmitted to a corresponding one of the mobile stations PSS1 to PSSm.

The reception system comprises a receiver (RX) 61, a digital demodulator (DEM) 62, an error correction decoder (CHDEC) 63, and a speech decoder (SPDEC) 64. The receiver 61 performs frequency conversion of a radio reception signal received through the antenna 58 and the high-frequency switch 57 in a predetermined time slot. The digital demodulator 62 establishes bit and frame synchronization with respect to the reception IF signal output from the receiver 61, and demodulates it into a coded reception signal. Note that information associated with the above synchronization establishment is supplied to the control circuit 71. The error correction decoder 63 performs error correction decoding of the digital demodulated signal output from the digital demodulator 62. The coded speech signal obtained by this error correction decoding is output to the speech decoder 64, while the coded control signal is supplied to the control circuit 71. The speech decoder 64 decodes the coded speech signal. The analog speech signal restored by this decoding operation is transmitted to a corresponding one of the wire lines CL1 to CLn through the hybrid circuit 51.

The control system comprises the control circuit (CONT) 71, the frequency synthesizer (SYN) 72, and a reception field strength detector (RSSI) 73. The frequency synthesizer 72 generates a local oscillation frequency corresponding to a radio channel designated by the control circuit 71. The reception field strength detector 73 detects the reception field strength of a radio transmission signal transmitted from a corresponding one of the mobile stations PSS1 to PSSm, and supplies the detection signal to the control circuit 71.

The control circuit 71 is constituted by, e.g., a microcomputer. This microcomputer includes a central processing unit (CPU) 81, an input port 82, an output port 83, a program ROM 84, and a data RAM 85. The CPU 81 executes a predetermined control operation in accordance with a program stored in the program ROM 84 in advance.

An operation of the system having the above-described arrangement will be described below.

In a waiting state, each of the mobile stations PSS1, PSS2, . . . repeatedly monitors the arrival of a ringing signal and a calling operation by using the control circuit 31 in steps 5a and 5b shown in FIG. 5B. Upon reception of a ringing signal from a corresponding one of the base stations BSS1, BSS2 . . . , the mobile station executes ringing control.

Assume that a caller operates a calling request switch in the console unit 34 of the mobile station PSS5 located at a position where the radio zones E1 and E2 of the base stations BSS1 and BSS2 overlap. In this case, calling control is started in the mobile station PSS5.

In step 5c, the control circuit 31 of the mobile station PSS5 sets "1" in a register k. In step 5d, the control circuit 31 controls the synthesizer 32 to receive a reception speech radio frequency $f_{R1}$ of a plurality of reception speech radio frequencies $f_{RK}$ (k=1, 2, . . . ) which the system possesses. In step 5e, the control circuit checks from the reception field strength of the frequency $f_{R1}$ whether all the time slots TS1 to TS6 are free. Furthermore, in step 5f, the control circuit 31 checks whether any of the time slots is free.

If it is determined that all the time slots TS1 to TS6 of the reception speech radio frequency $f_{R1}$ are currently used as shown in FIG. 6(a), the control circuit 31 of the mobile station PSS5 increments the value of the register k (k=k+1) in step 5g. The flow then returns to step 5d to receive a reception speech radio frequency $f_{R2}$ corresponding to k=2. In steps 5e and 5f, the control circuit 31 checks the use state of each of the time slots TS1 to TS6 of the reception speech radio frequency $f_{R2}$. If it is determined that none of the time slots TS1 to TS6 of the reception speech radio frequency $f_{R2}$ are free, the control circuit 31 increments the value of the register in step 5g. The flow then returns to step 5d to receive a next reception speech radio frequency $f_{R3}$ so as to check its use state. Subsequently, the control circuit 31 repeats the above control processing in the same manner as described above until it finds any free time slot of the time slots TS1 to TS6 of a received reception speech radio frequency.

Assume that a free time slot is found among the time slots TS1 to TS6 of the reception speech radio frequency $f_{R2}$, as shown in FIG. 6(b). In this case, the control circuit 31 detects a sync word from a reception signal in the currently used time slot TS1 of the reception speech radio frequency $f_{R2}$. The position of the free time slot TS2 following the time slot TS1 is calculated with reference to the position of the sync word, as shown in FIG. 6(c). In addition, information representing the position of the time slot TS2 is stored in the RAM 45 together with information representing the reception speech radio frequency $f_{R2}$ (step 5h). In step 5i, the control circuit 31 sets a usable control radio frequency C-CH in the frequency synthesizer 32 and, at the same time, forms a calling signal including the information representing the position of the free time slot, the information representing the reception speech radio frequency, and the ID code of the mobile station PSS5. This calling signal is then transmitted to the base station BSS1 at the control radio frequency C-CH.

Meanwhile, each of the base stations BSS1, BSS2, . . . repeatedly monitors the arrival of a ringing signal from the wire network NW (step 6a) and the arrival of a calling signal from a corresponding one of the mobile stations PSS1, PSS2, . . . (step 6b) by means of the control circuit 71 in a waiting state, as shown in FIG. 5A. In this state, a calling signal from the mobile station PSS5 arrives. In step 6c, the base station BSS1 forms a response signal including the ID code, of the mobile station PSS5, which is included in the calling signal. This response signal is then transmitted to the mobile station PSS5 at the control radio frequency C-CH.

Meanwhile, the mobile station PSS5 monitors the response signal from the base station BSS1 in step 5j while monitoring in step 5k whether a predetermined period of time elapses after the transmission of the calling signal. If the response signal is received within the predetermined period of time, a transmission speech radio frequency $f_{T2}$ as the counterpart of the reception speech radio frequency $f_{R2}$ is set in the frequency synthesizer 32. In addition, the control circuit 71 sets the power amplifier 16 in an operative state only for a period corresponding to the free time slot TS2, and starts transmission (step 5l). Note that if the response signal is not received when the predetermined period of time elapses after the start of the transmission of the calling signal, it is determined that a speech channel cannot be established by the currently used speech radio frequency and time slot. In this case, the flow returns to step 5d to select a speech radio frequency and a free time slot again.

Upon transmission of the response signal, the base station BSS1 sets a reception speech radio frequency, as the counterpart of the transmission speech radio frequency designated by the calling signal from the mobile station PSS2, in the frequency synthesizer 72. At the same time, the base station BSS1 sets the receiver 61 in an operative state only for a period corresponding to the free time slot TS2.

With the above-described operation, the base station BSS1 and the mobile station PSS2 are connected to each other through a radio speech channel based on the radio frequencies $f_{T2}$ and $f_{R2}$ and their time slots TS2, as shown in FIG. 6(d). Subsequently, this radio speech channel is used as part of a speech path to enable speech communication with a callee's telephone (not shown).

Figure 7:
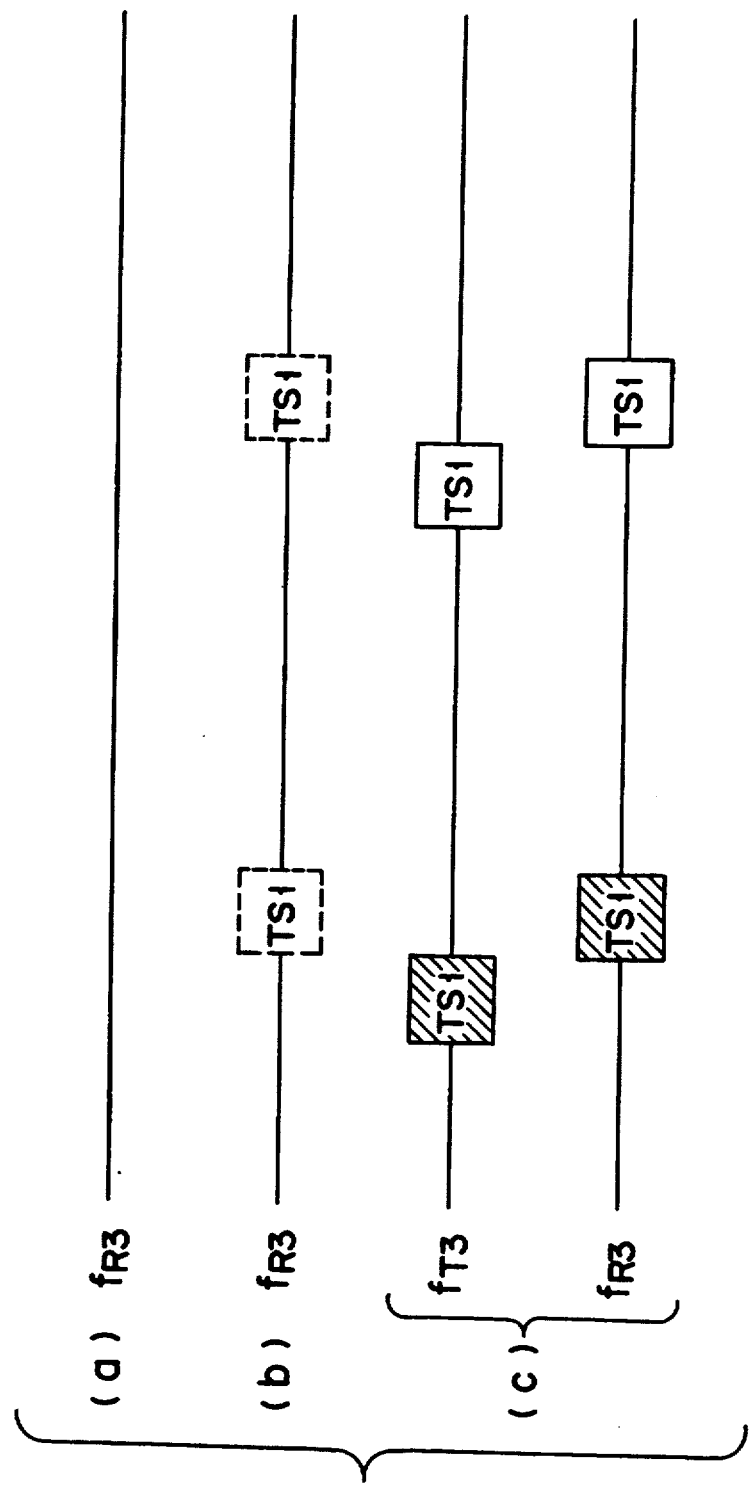

Assume that in selection/control of a free time slot, as shown in FIG. 7(a), it is detected that no time slot of the reception radio frequency $f_{R3}$ is currently used, i.e., all the time slots TS1 to TS6 are free. Whether all the time slots TS1 to TS6 are free is determined by monitoring whether reception field strengths corresponding to at least seven time slots are continuously detected.

In this case, the position of a free time slot cannot be determined with reference to the position of a currently used time slot. For this reason, the control circuit 31 in the mobile station PSS5 shifts the flow from step 5e to step 5m. In step 5m, as shown in FIG. 7(b), the control circuit 31 sets a time corresponding to the length of one time slot at an arbitrary timing on the reception speech radio frequency $f_{R3}$. In step 5n, the control circuit 31 stores this time as the time slot TS1 in the RAM 45. The control circuit 31 then inserts information representing the arbitrarily determined position of the time slot TS1 and information representing the reception radio frequency $f_{R3}$ in a calling signal, and transmits the resulting calling signal to the base station BSS1 in step 5. The subsequent operation is the same as that described above. As a result, as shown in FIG. 7(c), the mobile station PSS5 and the base station BSS1 are connected to each other through a radio speech channel constituted by the radio frequencies $f_{T3}$ and $f_{R3}$ and this time slots TS1.

When the current state is shifted to a speech communication state, the mobile station PSS5 and the base station BSS1 execute control of a timing shift between time slots during speech communication in the following manner.

Figure 8B:
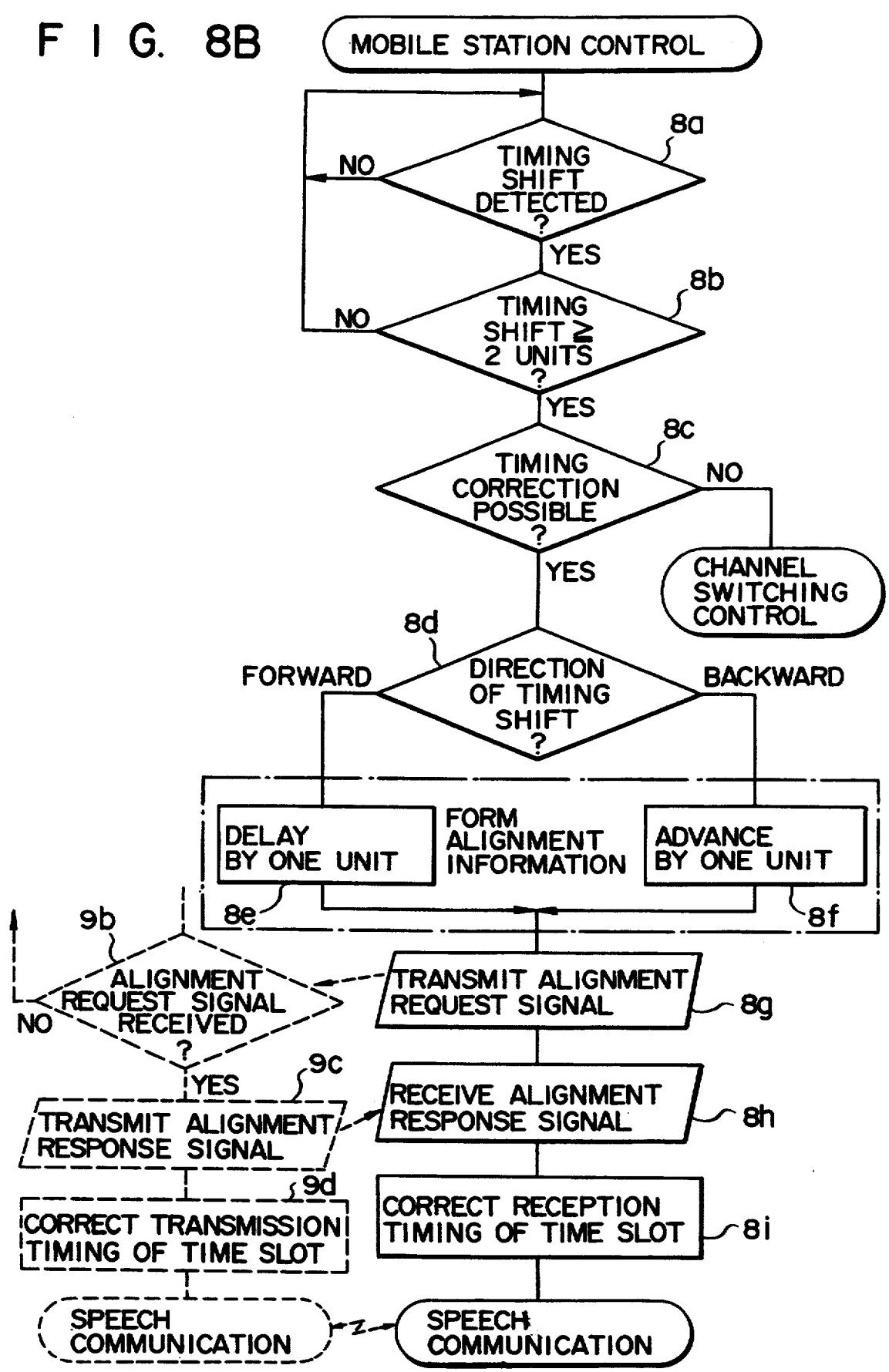
FIGS. 8A to 9 are flow charts showing the control sequences, associated with correction of timings, and control contents of control circuits of each base station and each mobile station.

The control circuit 31 of the mobile station PSS5 monitors a timing shift in step 8a in FIG. 8B. More specifically, the control circuit 31 detects the reception field strengths of the forward and backward shift detecting portions CSF and CSB added to a currently received time slot by using the reception field strength detector (RSSI) 33. Thereafter, the control circuit 31 checks whether each detection level is equal to or higher than a predetermined level. If it is equal to or higher than the predetermined level, it is determined that a timing shift occurred.

Assume that a timing shift is detected in this state. In this case, the control circuit 31 of the mobile station PSS5 checks the amount of the timing shift in step 8b. As shown in FIGS. 4(c) and 4(d), the forward and backward shift detecting portions CSF and CSB are time-divisionally divided into the detection units F1, F2, and F3, and B3, B2, and B1, respectively. The control circuit 31 counts the number of units, of the detection units F1, F2, and F3 or B3, B2, or B1, from which a reception field strength equal to or higher than the predetermined level is detected, and checks whether the number of counted units is two or more. If the number of units from which a reception field strength equal to or higher than the predetermined level is detected is less than two, i.e., one, it is determined that the timing shift falls within an allowable range. The flow then returns to step 8a to monitor a timing shift.

In contrast to this, if the number of units from which a reception field strength equal to or higher than the predetermined level is detected is two or more, the control circuit 31 checks in step 8c whether the timing shift can be corrected or not. This determination is performed by checking whether timing shifts are detected at both the forward and backward detecting portions CSF and CSB. If timing shifts are detected at both the detecting portions CSF and CSB, it is determined that timing correction cannot be performed. The flow then advances to channel switching control.

In contrast to this, if a timing shift is detected at either the forward shift detecting portion CSF or the backward shift detecting portion CSB, the control circuit 31 determines that timing correction can be performed. As a result, the flow advances to step 8d. In step 8d, it is checked whether the reception timing of the time slot is shifted forward or backward. Assume that the reception timing is shifted forward. In this case, time alignment information for delaying the reception timing of the time slot by one unit is formed in step 8e. In contrast to this, if the timing is shifted backward, time alignment information for advancing the reception timing of the time slot by one unit is formed in step 8f. Subsequently, in step 8g, an alignment request signal including this time alignment information is transmitted to the base station BSS1.

Meanwhile, the base station BSS1 repeatedly monitors the arrival of a channel switch request signal and of an alignment request signal by using the control circuit 71 in steps 9a and 9b in FIG. 8A. If the alignment request signal from the mobile station PSS5 in communication arrives in this state, the control circuit 71 of the base station BSS1 forms and transmits an alignment response signal in step 9c. In step 9d, the control circuit 71 corrects the transmission timing of a transmission time slot destined to the mobile station PSS5 on the basis of the time alignment information included in the alignment request signal. Thereafter, the control circuit 71 continues the speech communication through this time slot.

Upon transmission of the alignment request signal, the mobile station PSS5 monitors the alignment response signal from the base station BSS1 in step 8h. If the reception of the alignment response signal is confirmed, the control circuit 31 corrects the reception timing of the reception time slot in accordance with the time alignment information in step 8i. Subsequently, the speech communication is restored.

In this manner, the timing shift between the time slots during the speech communication is corrected to fall within the allowable range. With this operation, the mobile station PSS5 can continue the high-quality speech communication without being influenced by interference between the time slots.

In contrast to this, if it is determined in step 8c that timing correction cannot be performed, speech channel switching control is performed in the following manner.

Figure 9:
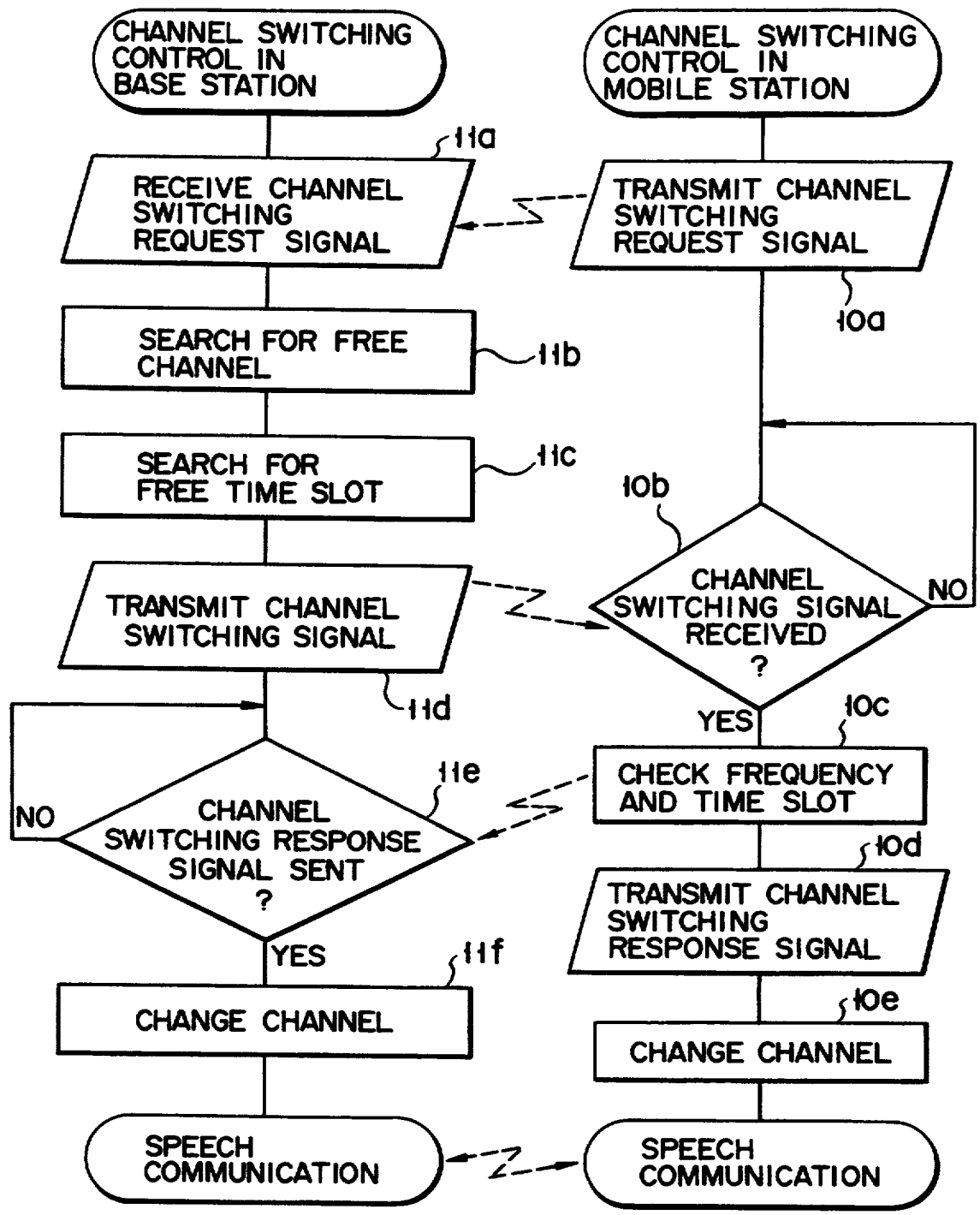
Figure 10:
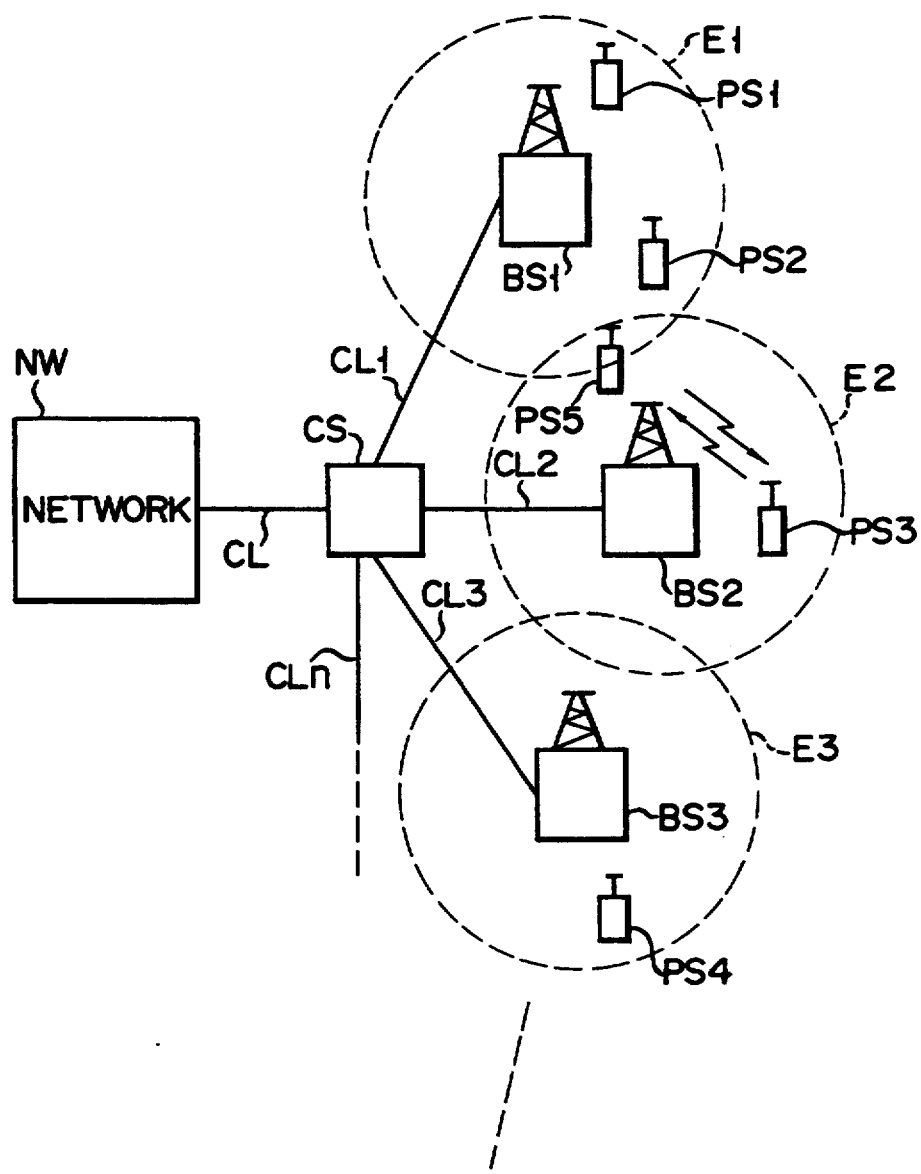
FIG. 10 is a block diagram showing an arrangement of a conventional portable radio telephone system.

As shown in FIG. 9, the control circuit 31 of the mobile station PSS5 generates a channel switching request signal and transmits it to the base station BSS1 in step 10a.

Meanwhile, the base station BSS1 monitors the arrival of a channel switching request signal in step 9a, as described above. If the channel switching request signal from the mobile station PSS5 arrives in this state, channel switching control is subsequently executed. More specifically, as shown in FIG. 9, the reception of the channel switching request is confirmed in step 11a. If the signal is destined to the base station BSS1, the control circuit 71 selects another usable speech radio frequency from the plurality of speech radio frequencies which the system possesses, in step 11b. In step 11c, the control circuit 71 selects a free time slot from the time slots of the selected speech radio frequency. When a new speech radio frequency and a free time slot are found in this manner, a channel switching signal including speech channel information representing them is formed. In step 11d, this signal is transmitted to the mobile station PSS5.

Upon transmission of the channel switching request signal, the control circuit 31 of the mobile station PSS5 monitors the arrival of a channel switching signal from the base station BSS1 in step 10b. If the channel switching signal from the base station BSS1 arrives in this state, the flow advances to step 10c to check from the speech channel information inserted in the channel switching signal whether the new radio speech channel can be used. If the new channel can be used, the channel switching response signal is sent to the base station BSS1 in step 10d. After the channel switching response signal is transmitted, the speech channel, i.e., the speech radio frequency and the time slot, is switched to the new speech channel in step 10e. Thereafter, the speech communication is restored. Note that if the radio speech channel designated by the speech channel information cannot be used, the channel switching request signal is transmitted again without sending a channel switching response signal.

After the channel switching signal is transmitted, the base station BSS1 monitors the arrival of a channel switching response signal from the mobile station PSS5 in step 11e. If the channel switching response signal is received in this state, the flow advances to step 11f to execute speech channel switching control. Thereafter, the speech communication is restored.

In this manner, a speech channel in which a timing shift occurs is switched to another speech channel, and the speech communication is continued through the speech channel.

As described above, in this embodiment, the mobile station PSS5 monitors the presence/absence of a timing shift at the shift detecting portions CSF and CSB of a reception time slot during speech communication. If a timing shift is detected, timing correction of corresponding time slots is performed. Therefore, even if a timing shift is caused between time slots due to the clock precision difference between the base stations SBSS1 and BSS2 during speech communication, the timings of the time slots can be corrected before interference occurs between the time slots.

In this case, the shift detecting portions CSF and CSB are time-divisionally divided into the detection units F1, F2, and F3 and B3, B2, and B1, respectively. A shift amount is detected by using the detection units, and timing correction is performed in accordance with the shift amount, thus allowing quick, proper timing correction.

If timing shifts are detected at the forward and backward shift detecting portions CSF and CSB, it is checked whether the timing shifts can be corrected. If correction cannot be performed, the speech channel is switched to a new speech channel. With this operation, even if interference is likely to occur between a currently used time slot and its adjacent time slots before and after the currently used time slot, i.e., timing correction cannot be performed, proper speech communication can be continued through the new speech channel.

Interference between time slots is caused by a frequency shift of a transmission clock. That is, in order to prevent interference between time slots, the clock precision of each mobile station and each base station may be improved. However, in order to improve clock precision, a high-precision quartz oscillator, a high-precision temperature compensating circuit, and the like are required, resulting in complication of a circuit and an increase in cost. In contrast to this, according to this embodiment, since timing correction is performed before interference between time slots is caused, no high-precision quartz oscillator and temperature compensating circuit are required. This allows a simple circuit arrangement and a reduction in cost.

In addition, since a large guard time need not be set to absorb interference between time slots, no deterioration in transmission efficiency occurs.

The present invention is not limited to the embodiment described above. For example, in the above embodiment, a timing shift between time slots is detected in each mobile station. However, such a timing shift may be detected in each base station or may be detected in both mobile and base stations.

Furthermore, a specific code may be inserted in a timing shift detection interval so that a timing shift between time slots can be detected by checking whether the specific code is detected in a reception period.

In the above embodiment, the present invention is applied to the system having no control station. However, the present invention can be applied to a system including a simple control station which does not collectively control the transmission/reception timings of time slots in the respective base stations.

In addition, in the above embodiment, the present invention is applied to the portable radio telephone system. However, the present invention can be applied to other mobile radio communication systems such as a vehicle telephone system and a cordless telephone system. Furthermore, the present invention can be applied to a system for transmitting data by radio, e.g., a teleterminal system, and a system for transmitting facsimile image data or video data. That is, the present invention can be applied to any type of system as long as it is a radio communication system using the TDMA scheme as a scheme for accessing radio channels.

Furthermore, in the embodiment describe above, a timing shift in a speech channel is detected and corrected. However, the present invention can be applied to a control channel. Moreover, in the above embodiment, each of forward and backward timing shift detecting portions is divided into three detection units. However, the number of detection units may be set to be two or four or more, as needed.

With regard to other features, e.g., the arrangements, control sequences, and contents of mobile and base stations, various changes and modifications can be made within the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radio tele-communication system comprising:
 a plurality of base stations;
 a plurality of mobile stations connected to said base stations through radio channels;
 at least one radio frequency being shared by said plurality of base and mobile stations;
 a signal transmitted at the radio frequency having a time frame constituted by a plurality of time-divisionally multiplexed time slots;
 time intervals for detecting timing shifts being set between the plurality of time slots; and
 each of said base stations and said mobile stations including;
  timing shift detecting means for detecting a communication timing shift in a time slot currently used for communication during a signal reception state in the time intervals for detecting timing shifts; and
  timing correcting means for correcting the communication timing of the corresponding time slot in cooperation with a station, with which communication is performed, on the basis of the communication timing shift detection result obtained by said timing shift detecting means.

2. A system according to claim 1, wherein each of the time intervals for detecting timing shifts is time-divisionally divided into a plurality of sub-intervals, said timing shift detecting means detects a communication timing shift amount during a signal reception state in each of the plurality of sub-intervals, and said timing correcting means corrects the communication timing of the corresponding time slot on the basis of the communication timing shift amount detected by said timing shift detecting means.

3. A radio tele-communication system comprising:
 a plurality of base stations;
 a plurality of mobile stations connected to said base stations through radio channels;
 at least one radio frequency being shared by said plurality of base and mobile stations;
 a signal transmitted at the radio frequency having a time frame constituted by a plurality of time-divisionally multiplexed time slots;
 time intervals for detecting timing shifts being set between the plurality of time slots, wherein a specific code is inserted in each of said time intervals; and
 each of said base stations and said mobile stations including;
  timing shift detecting means for detecting a communication timing shift in a time slot currently used for communication during a signal reception state in the time intervals for detecting timing shifts, said timing shift detecting means monitoring whether the specific code is detected upon reception of a time slot currently used for communication, and recognizing a communication timing shift of the time slot when the specific code is detected; and
  timing correcting means for correcting the communication timing of the corresponding time slot in cooperation with a station, with which communication is performed, on the basis of the communication timing shift detection result obtained by said timing shift detecting means.

4. A radio tele-communication system comprising:
 a plurality of base stations;
 a plurality of mobile stations connected to said base stations through radio channels;
 at least one radio frequency being shared by said plurality of base and mobile stations;
 a signal transmitted at the radio frequency having a time frame constituted by a plurality of time-divisionally multiplexed time slots;
 time intervals for detecting timing shifts being set between the plurality of time slots; and
 each of said base stations and said mobile stations including;
  timing shift detecting means for detecting a communication timing shift in a time slot currently used for communication during a signal reception state in one of the time intervals for detecting timing shifts;
  determining means for checking, on the basis of the communication timing shift detection result obtained by said timing shift detecting means, whether a communication timing of the corresponding time slot can be corrected;
  timing correcting means for correcting the communication timing of the corresponding time slot in cooperation with a station, with which communication is performed, if said determining means determines that the communication timing can be corrected; and
  channel changing means for changing the time slot in cooperation with the station with which communication is performed, if said determining means determines that the communication timing cannot be corrected.

5. A system according to claim 4, wherein each of the time intervals for detecting timing shifts is time-divisionally divided into a plurality of sub-intervals, said timing shift detecting means detects a communication timing shift amount during a signal reception state in each of the plurality of sub-intervals, and said determining means checks, on the basis of the communication timing shift amount detected by said timing shift detecting means, whether the communication timing of the corresponding time slot can be corrected.

6. A mobile station apparatus used in a radio tele-communication system comprising a plurality of base stations and a plurality of mobile stations connected to said base stations through radio channels, at least one radio frequency being shared by said plurality of base and mobile stations, a signal transmitted at the radio frequency having a time frame constituted by a plurality of time-divisionally multiplexed time slots, and time intervals for detecting timing shifts being set between the plurality of time slots, the apparatus comprising:
 timing shift detecting means for detecting a communication timing shift in a time slot currently used for communication during a signal reception state in the time intervals for detecting timing shifts; and
 timing correcting means for correcting the communication timing of the corresponding time slot in cooperation with a station, with which communication is performed, on the basis of the communication timing shift detection result obtained by said timing shift detecting means.

7. An apparatus according to claim 6, wherein each of the time intervals for detecting timing shifts is time-divisionally divided into a plurality of sub-intervals, said timing shift detecting means detects a communication timing shift amount during a signal reception state in each of the plurality of sub-intervals, and said timing correcting means corrects the communication timing of the corresponding time slot on the basis of the communication timing shift amount detected by said timing shift detecting means.

8. A mobile station apparatus used in a radio telecommunication system comprising a plurality of base stations and a plurality of mobile stations connected to said base stations through radio channels, at least one radio frequency being shared by said plurality of base and mobile stations, a signal transmitted at the radio frequency having a time frame constituted by a plurality of time-divisionally multiplexed time slots, and time intervals for detecting timing shifts being set between the plurality of time slots, the apparatus comprising:

timing shift detecting means for detecting a communication timing shift in a time slot currently used for communication from a reception state in one of the time intervals for detecting timing shifts;

determining means for checking, on the basis of the communication timing shift detection result obtained by said timing shift detecting means, whether a communication timing of the corresponding time slot can be corrected;

timing correcting means for correcting the communication timing of the corresponding time slot in cooperation with a station, with which communication is performed, if said determining means determines that the communication timing can be corrected; and channel changing means for changing the time slot in cooperation with the station with which communication is performed, if said determining means determines that the communication timing cannot be corrected.

9. A base station apparatus used in a radio tele-communication system including a plurality of base stations and a plurality of mobile stations connected to said base stations through radio channels, at least one radio frequency being shared by said plurality of base and mobile stations, a signal transmitted at the radio frequency having a time frame constituted by a plurality of time-divisionally multiplexed time slots, and time intervals for detecting timing shifts being set between the plurality of time slots, the apparatus comprising:

timing shift detecting means for detecting a communication timing shift in a time slot currently used for communication during a signal reception state in the time intervals for detecting timing shifts; and timing correcting means for correcting the communication timing of the corresponding time slot in cooperation with a station, with which communication is performed, on the basis of the communication timing shift detection result obtained by said timing shift detecting means.

10. An apparatus according to claim 9, wherein each of the time intervals for detecting timing shifts is time-divisionally divided into a plurality of sub-intervals, said timing shift detecting means detects a communication timing shift amount during a reception state in each of the plurality of sub-intervals, and said timing correcting means corrects the communication timing of the corresponding time slot on the basis of the communication timing shift amount detected by said timing shift detecting means.

11. A base station apparatus used in a radio telecommunication system including a plurality of base stations and a plurality of mobile stations connected to said base stations through radio channels, at least one radio frequency being shared by said plurality of base and mobile stations, a signal transmitted at the radio frequency having a time frame constituted by a plurality of time-divisionally multiplexed time slots, and time intervals for detecting timing shifts being set between the plurality of time slots, the apparatus comprising:

timing shift detecting means for detecting a communication timing shift in a time slot currently used for communication from a reception state in one of the time intervals for detecting timing shifts;

determining means for checking, on the basis of the communication timing shift detection result obtained by said timing shift detecting means, whether a communication timing of the corresponding time slot can be corrected;

timing correcting means for correcting the communication timing of the corresponding time slot in cooperation with a station, with which communication is performed, if said determining means determines that the communication timing can be corrected; and channel changing means for changing the time slot in cooperation with the station with which communication is performed, if said determining means determines that the communication timing cannot be corrected.

* * * * *